(12) United States Patent
Datta et al.

(10) Patent No.: US 6,495,014 B1
(45) Date of Patent: Dec. 17, 2002

(54) ELECTRODEIONIZATION SUBSTRATE, AND DEVICE FOR ELECTRODEIONIZATION TREATMENT

(75) Inventors: Rathin Datta, Chicago, IL (US); YuPo Lin, Westmont, IL (US); Dennis Burke, Roscoe, IL (US); Shih-Perng Tsai, Naperville, IL (US)

(73) Assignee: University of Chicago, Chicago, IL (US)

( * ) Notice: Subject to any disclaimer, the term of this patent is extended or adjusted under 35 U.S.C. 154(b) by 0 days.

(21) Appl. No.: 09/806,683

(22) PCT Filed: Aug. 17, 2000

(86) PCT No.: PCT/US00/22624

§ 371 (c)(1),
(2), (4) Date: Jul. 12, 2001

(87) PCT Pub. No.: WO01/12292

PCT Pub. Date: Feb. 22, 2001

(51) Int. Cl.⁷ ............................ C25C 7/00; C02F 1/469; C25B 13/00; C08J 5/20; B01D 24/00

(52) U.S. Cl. .................... 204/533; 204/252; 204/524; 204/536; 204/633; 204/634; 521/28; 210/290

(58) Field of Search .................. 204/252, 633, 204/634, 524, 533, 536, 532; 210/290; 521/28

(56) References Cited

U.S. PATENT DOCUMENTS 5,759,373 A * 6/1998 Terada et al. ............... 204/524
6,071,397 A * 6/2000 Terada et al. ............... 204/632

* cited by examiner

*Primary Examiner*—Nam Nguyen
*Assistant Examiner*—Thomas H. Parsons
(74) *Attorney, Agent, or Firm*—Cherskov & Flaynik

(57) ABSTRACT

A porous immobilized ion-exchange material is provided. Also provided is an electrodeionization device incorporating the material. A method for subjecting a fluid to electrodeionization, is provided utilizing porous immobilized ion-exchange material. A salient feature of the material is that it can be regenerated in situ.

13 Claims, 4 Drawing Sheets

ELECTRODEIONIZATION SUBSTRATE, AND DEVICE FOR ELECTRODEIONIZATION TREATMENT

This patent application claims 35U.S.C. priority based on PCT Application US00/22624, filed on Aug. 17, 2000.

STATEMENTS REGARDING FEDERALLY SPONSORED RESEARCH AND DEVELOPMENT

The United States Government has rights in this invention under Contract No. W-31-109-ENG-38 between the U.S. Department of Energy and the University of Chicago representing Argonne National Laboratory.

BACKGROUND OF THE INVENTION

1. Field of the Invention

The present invention relates to electrodeionization and more particularly, the invention relates to an electrodeionization substrate and a device for treating fluids via electrodeionization.

2. Description of the Related Art

Prior to their ultimate use, feed streams must often be pretreated to remove unwanted ionic contaminants. Typical clean-up processes include the use of ion-exchange resins and electrodialysis. In ion-exchange, after the targeted ions are removed from a feed solution, the ion-exchange resins are exhausted and have to be regenerated by acids, bases, or salts. Thus the process produces an equivalent or higher amount of waste salt stream from the regeneration process.

Electrodialysis is an electrically driven ion-exchange membrane based process where by using a stack of alternating cation, anion, or bipolar membranes, ions are re-moved from a feed solution and purified and concentrated in a product or concentrate solution. Since the transport of the ions are done by electric power, electrodialysis processes do not consume equivalent quantities of acids, bases, or salts and do not produce a salt waste stream. When the ion concentration in the feed stream is low, i.e. below 0.5 to 1%, electrodialysis processes become unattractive because the low ionic conductivity in the dilute feed stream leads to very low flux and high energy consumption.

Electrodeionization (EDI), also known as "electrochemical ion-exchange", at is an advanced ion-exchange technology that combines the advantages of ion-exchange and electrodialysis. In electrodeionization processes, ion-exchange resins are sequestered in dilute feed compartments to increase the ionic conductivity, so that even with an ionically dilute feed, a stable operation with higher flux and lower energy consumption than electrodialysis, becomes possible. The electric power also splits the water ($H_2O$) to H+ and OH– ions and the resins are thus regenerated while the ions are removed.

EDI technology is increasingly being used to make deionized water for boiler feed and high purity industrial water applications. There are also many other potential uses of such technology for deionization of organic process streams in the food processing and chemical industries. These uses will not need the removal of ions to low parts per million or parts per billion levels as is required for high purity water production. However, these process streams will have multiple types of ions, other contaminants and potential foulants, and high concentrations of organics, which cannot be lost from the feedstream. Thus, the EDI devices for these applications must be easily dissembled for frequent cleaning. Also, process economics require that there is virtually no leakage between the product feed and the salt concentrate that is removed.

Many configurations and devices have been patented for electrodeionization. Almost all of them have cation and anion exchange membranes flanking loose ion-exchange resins or beads. In order to prevent the escape of these beads, a wide variety of and confining/sealing methods are employed. For example, in U.S. Pat. No. 4,804,451 a very complex configuration of a spacer element is described wherein the cation and anion membranes are bonded by special adhesives to the spacer element to form a pocket. The anion and cation exchange resin beads are confined within these complex pockets. A very complex assembly of the spacers and membrane resin pockets are then put together to reduce leakage between the dilute and the concentrate compartments.

In U.S. Pat. No. 4,956,071 the membranes are compartmentalized via evenly spaced ribs to which the membranes are bonded with loose ion exchange resins filling these pockets. A complex assembly of these compartments are put together to prevent leakage between the dilute and the concentrate compartments.

Patents also exist (U.S. Pat. Nos. 4,747,929 and 5,681,438) describing complex spacer construction configurations incorporating attached membranes and loose ion exchange resins interspersed between.

U.S. Pat. No. 5,346,924 describes a method for making a non-porous ion exchange membrane using an ion exchange resin, and binders such as polyethylene of linear low density or high density are described. These non-porous membranes are then described in an electrodeionization assembly with loose ion exchange resins in compartmentalized pockets that are similar to the previously described patents.

Another U.S. Pat. No. 5,308,467 describes an apparatus that creates an ion exchange material from mono-filaments of cation and anion exchange material by radiation grafting and this ion exchange material can then be assembled between ion exchange membranes to make an electrodeionization apparatus.

EDI devices typically are utilized as a final polishing step for already ultra-pure water. As such, fouling of the rather complex compartmentalization and flow channels of EDI systems is relatively rare. Indeed, such systems are usually sealed upon manufacture inasmuch as the need for disassembly to facilitate cleaning is nil. Most of the current configurations develop small leaks from the dilute/feed compartments to the concentrate compartments. Whereas this is not a significant economic penalty for the production of ultra-pure water, such leaks cannot be tolerated for use with organic feedstreams where such losses from the feed would be uneconomical.

In light of the foregoing, none of the current ED devices provide for having simple assembly and disassembly to facilitate cleaning and reuse. Also, none of the current EDI devices provide for virtually leak-free conditions between the feed compartment and the concentrate compartment. Such optimal characteristics are required for EDI devices used to treat process streams high in organic material content, such as corn syrups, glycerol and others.

Ion exchange beads that are commonly used for EDI applications consist of strongly acidic containing sulfonic acid groups, or strongly basic containing quaternary ammonium groups. Other resins such as those with weakly acidic (carboxylic acid) or weakly basic (amines) groups are also used when required. These beads are cross-linked polymers usually styrene—divinyl benzene or acrylates. The resins can be gel type or macro-reticular type. Usually equivalent mixtures of cationic and anionic resins are used in the EDI compartments. For specialized applications one type of resin or adsorbent beads mixed with ion-exchange resins may be used.

The complexity of the current EDI devices primarily come from the need to confine the loose ion exchange or other adsorbent beads between the membranes while keeping very close contact amongst these beads and between the beads and the membranes. In one case that gets away from the beads (previously cited U.S. Pat. No. 5,308,467) a complex radiation grafting process with mono-filament of ion-exchange material is disclosed.

A need exists in the art for a porous immobilized ion-exchange material. The material should be readily adaptable to current EDI stack configurations. Also, a need exists for an EDI device incorporating porous immobilized ion-exchange material whereby the device minimizes leakage of feed and also minimizes contamination of feed with any concentrate waste stream formed. The material and device should not have ion-exchange particle leakage even at high flow rates, and the material should be regenerable in situ. The material also should be produced with common substrates.

SUMMARY OF THE INVENTION

It is the object of the present invention to provide a porous ion-exchange material and a device incorporating the material which overcomes many of the disadvantages of the prior art.

Another object of the present invention is to provide a porous but immobilized ion-exchange material. A feature of the invention is that standard ion-exchange particles are combined with a binder material to immobilize them while also maintaining the molecular characteristics (such as porosity and internal surface area) of the particles. An advantage of the invention is conferring a high degree of ionic conductivity between individual particles of the standard material while also allowing high throughput of the treated liquid stream.

Yet another object of the invention is to provide an economical method for subjecting feed streams to electrodeionization. A feature of the invention is the utilization of a porous, immobilized ion-exchange material which provides ion-conductivities higher than the feed stream. An advantage of the invention is the ability for the material to regenerate in situ.

Briefly, the invention provides a porous immobilized ion-exchange material comprising ion-exchange resins having cation-exchange moieties and anion-exchange moieties; and a means for immobilizing the moieties relative to each other while conferring ion-conductivity and liquid permeability to the material.

Also provided is an electrodeionization device comprising a cation-exchange membrane; an anion-exchange membrane juxtaposed co-planarly to said cation exchange membrane; porous ion-exchange material positioned intermediate said cation-exchange membrane and said anion exchange membrane to form a compartment, whereby the material comprises anion-exchange entities and cation exchange entities immobilized relative to each other via a binder which comprises at least 20 weight percent of said material; and a means for applying an electrical potential to said compartment, wherein the entities are embedded in thermoplastic selected from the group consisting of low linear density polyethylene, high density polyethylene, and combinations thereof. In one example, binder is present in a weight ratio to the entities of 1:3.

The invention also provides for a method for subjecting a fluid to electrodeionization, the method comprising supplying a porous, ion-exchange material wherein the material comprises anion exchange entities and cation exchange entities immobilized relative to each other; applying an electrical potential across the material; contacting the fluid to the substrate so as to facilitate removal of ionic contaminants from the fluid; and simultaneous with the step containing the fluid to the substrate regenerating the resin, in situ.

BRIEF DESCRIPTION OF THE DRAWINGS

These and other objects and advantages of the present invention will become readily apparent upon consideration of the following detailed description and attached drawings, wherein.

DETAILED DESCRIPTION OF THE INVENTION

A porous, immobilized ion-exchange material and an EDI device incorporating the material is provided. The device is unique for removing ionic contaminants from a feed stream without loss from the treated feed stream. Typical impurities removed by the invented substrate and method include the chloride and sulfate salts of sodium and potassium, various organic acids, proteins, and color bodies. A very suitable application for the invented material and device is in the purification of such fluids as corn sweetener syrups.

Figure 1:
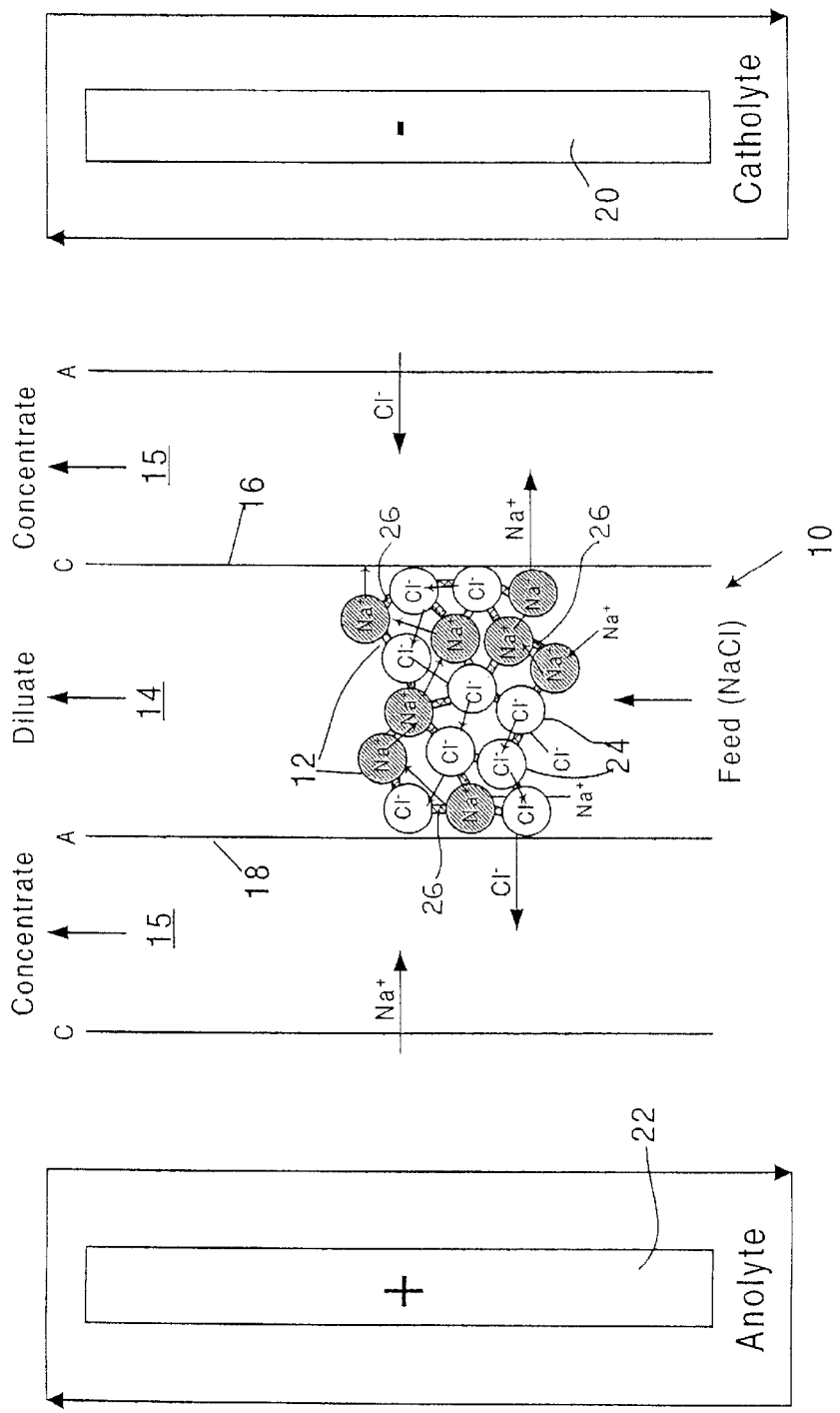
FIG. 1 is a schematic depiction of an EDI process incorporating the invented porous immobilized ion-exchange material, in accordance with features of the present invention.

A general overview of an improved electrodeionization device is designated as numeral 10 in FIG. 1. A salient feature of the device is a unique porous, immobilized ion-exchange material 12 which facilitates rapid deployment of ionic contaminants out of a diluate conduit, 14.

The material, discussed infra, is removably positioned between (i.e., intermediate) a cation exchange membrane 16 and an anion exchange membrane 18, the entire triad therefore comprising a "cell compartment." A means for facilitating ion transport through this compartment is employed. For example, an electrical potential imparted via opposing electrodes 20, 22 (cathode and anode, respectively) provides the gradient to facilitate ion transfer out of the diluate conduit 14, and into the respective concentrate conduits 15.

An exemplary formulation of the material is that of making it into wafers of uniform thickness. This wafer configuration confers the following three advantages to EDI processes: First, the inventors found that in very dilute solutions, where most of the deionization takes place, the ionic conductance of the wafer is higher than that of the solution itself. This means that the wafers will aid in the EDI process efficiency and increase throughput when compared to trying to deionize the solution itself.

Second, when the wafers are incorporated in a standard ED stack configuration, no leakage between the compartments occurred, even when the flow rates 28 were 5 to 10 fold higher than that used in typical EDI processes.

Third, the wafer configuration facilitated the demineralization of dilute salt in water and dilute salt in a concentrated carbohydrate solution.

Preparation Detail of Porous Immobilized Ion-Exchange Material

Finely dispersed latex emulsions 26 that are micron sized elastomer emulsions are commonly used for coating surfaces. Recently fluorinated latex elastomers such as those sold under the trade name Fluorolast by Lauren Chemicals of New Philadelphia, Ohio, are available in aqueous medium with the fluoroelastomer emulsion particles in 0.5 to 2 microns in size. Generally these are used for coating concrete surfaces or metal surfaces to provide very durable and chemical resistant coatings because the fluoropolymers are chemically resistant to acids and alkali and are stable to moderately high temperatures up to 200° C. Typically these elastomer dispersions are mixed with a catalytic curing agent which have aminoalkyl functionalities such as oligomeric aminoalkyl siloxanes. The mixture is then sprayed or spread on the surface to be coated. Upon drying the elastomer particles adhere to the surfaces as well get cross linked to each other and form a very durable non-porous coating.

Surprisingly and unexpectedly, the inventors have found that these latex emulsions, natural rubbers, and combinations thereof, are suitable for making ion-exchange materials with a high degree of porosity; in other words, when applied to ion-exchange resin beads, the latex was found not to coat the outer surfaces of the resin beads and render them unsuitable for ion-exchange or contaminant removal. The novel findings of this invention show that these aqueous elastomer latex emulsions when properly used can indeed produce a porous, immobilized, ion-exchange material from ion exchange resin beads which have the following highly desirable properties.

- The molecular sized pores and the molecular porosity and the internal surface area of the resin and the beads are maintained.
- The external surfaces are not substantially coated or blinded to impede the passage of the ions and other impurities.
- The material is very porous so that the liquid stream easily flows through it with little pressure drop or channeling.
- The resin bead particles are in close contact so that the overall ion transport properties or mass transport properties are not substantially reduced when compared to the packed bed.
- The immobilized matrix can handle the resins shrinking and swelling and does not fall apart.
- The material has good mechanical properties so that it can be moved, handled, cut, squeezed and stretched.

The following examples are intended merely to illustrate the utility of the invented substrate and method. As such, the specific constituents of the formulations in the examples should not be construed to relegate the scope of the invention thereto. Generally, however, weight ratios of the resin to binder range from 20:1 to 3:1.

EXAMPLE 1

The following is a general protocol for producing porous immobilized ion-exchange material using a water-borne fluoroelastomer. In this example, the fluoroelastomer FLUOROLAST® was used to bind the mixed cation and anion resins 24 to form a thick wafer. The mixed resins used were the strong acid gel-type cation (C100E) and strong base gel-type anion (A444) resins supplied by Purolite Inc. Two different types of wafer were made using different resins that varied in particle size and particle size distribution. The following general procedure was used to make a wafer molded to fit inside a hollowed out and shaped rubber gasket. Such a wafer filled gasket could then be used in to make an EDI stack.

1. A concentration in the range of 35–70% w/w of fluoroelastomer in emulsion was mixed with 2–10% w/w of the aminoxyl siloxane catalystcuring agent.
2. The mixed cation and anion resins were packed, in wet form, into the rubber mold gasket. This was approximately 6 millimeter thick and shaped to have inlet and outlet ports that would become suitable for use in an EDI stack.
3. A perforated supporting plate covered with one sheet of a nylon screen and additional perforated wax paper on the top of the screen was placed beneath the resin and mold gasket.
4. The free water trapped between the wet resin beads was removed by letting it drain out or by vacuuming.
5. The fluoroelastomer solution was allowed to cure for approximately 15–60 minutes in air at room temperature before applying (pouring) onto the molded resin bed.
6. After a second application of the fluoroelastomer solution, the excess was drained away and then the resin and mold was put into the oven at temperatures ranging between 25 to 50° C. for 24–72 hours to cure and dry.
7. After the curing and drying, the resin wafer would shrink in size. Water was added and the resin wafer swelled to fit tightly into the rubber mold gasket. The supporting plate along with the polymer screen and the wax paper were removed.

This material was examined under an optical microscope at a magnification ranging from 100 to 400. A schematic drawing of the structure is shown in FIG. 1. The resin beads are connected to each other by strands of elastomer binding polymer with such strands (noted herein as dendrites) binding through only a small fraction of the resin beads surface area. The material was very porous as evidenced by free passage of water that was dropped on top or on the side of the resin wafer. The material was firm and could be taken out of the mold gasket, cut and shaped with a sharp knife. The material could be squeezed and stretched like an elastomeric material.

The ionic electrical resistance of this material was measured to determine its ionic conductivity. Low resistance, i.e. high ionic conductivity, indicates that the transport to the ion exchange sites inside the resin beads is not blinded. It also indicates that the material is porous, allowing the bulk solution to flow while simultaneously confirming that the ion exchange beads are not separated far from each other by other ionically non conduction materials.

The ion electric resistance with and without a 6 mm thick wafer made of the material were measured in solutions of different NaCl concentrations. A four-point ac impedance measurement (LCZ 3321, Keithley Instruments, Inc., Cleveland, Ohio) was used to determine the ion electric resistance of the resin wafer. As indicated in Table 1, the high ionic resistance of the solution was lowered by the presence of resin wafer when the NaCl concentrations were less than 500 ppm. This means that this material has good ionic conductivity and would aid in the transport of ions from dilute solutions.

This property makes this material very suitable for electrodeionization applications, because in most applications electrodeionization (EDI) technology needs to reduce the ion concentration to less than 50 ppm.

TABLE 1

Ionic Conductivity Measurement Data

| Solution NaCl | Resin Wafer Specific Resistance (ohm-cm) | Solution Specific Resistance (ohm-cm) | Ratio of S.R. Wafer/Sol |
|---|---|---|---|
| 500 ppm | 893.8 | 653.9 | 1.37 |
| 100 ppm | 1363.0 | 3033.7 | 0.45 |
| 50 ppm | 998.0 | 4448.3 | 0.22 |
| 20 ppm | 1114.4 | 8543.1 | 0.13 |

EXAMPLE 2

Wafers were manufactured using 15 to 20 weight percent polyethylene as binding material. The ion exchange resins used in one wafer were the macroreticular type of strong acid cation exchange resin (Purolite C-155), available from Purolite, Inc., Bala Cynwyd, Pa. and the gel type of strong base anion exchange resin (Purolite A-444). The resins and the polyethylene were mixed, heated and molded to produce a porous wafer. Each wafer is 6.0 mm thick. The average thickness variations of different spots on one single wafer is less than 0.5% (i.e., 0.05 mm).

TABLE 2

Additional Ion-Conductivity Measurements of Porous Immobilized Ion-Exchange material.

| Solution NaCl | Resin Wafer Specific Resistance (ohm-cm) | Solution Specific Resistance (ohm-cm) | Ratio of S.R. Wafer/Sol |
|---|---|---|---|
| 100 ppm | 3054 | 2267 | 1.35 |
| 50 ppm | 2878 | 3707 | 0.78 |
| 20 ppm | 2379 | 8625 | 0.28 |

The ion electric resistances of the solution with and without resin wafer were measured in different NaCl concentrations. A four-point ac impedance measurement (LCZ 3321, Keithley Instruments, Inc., Cleveland, Ohio) was used to acquire the ion electric resistance of the resin wafer. As indicated in Table 2, the high electric resistances of the solution were improved by the presence of resin wafer when the NaCl concentrations were less than 50 ppm. Most of the use of electrodeionization (EDI) technology need to reduce the ion concentration to less than 50 ppm. Therefore, the resin wafer can be very suitable for use in the EDI process.

EXAMPLE 3

Figure 2:
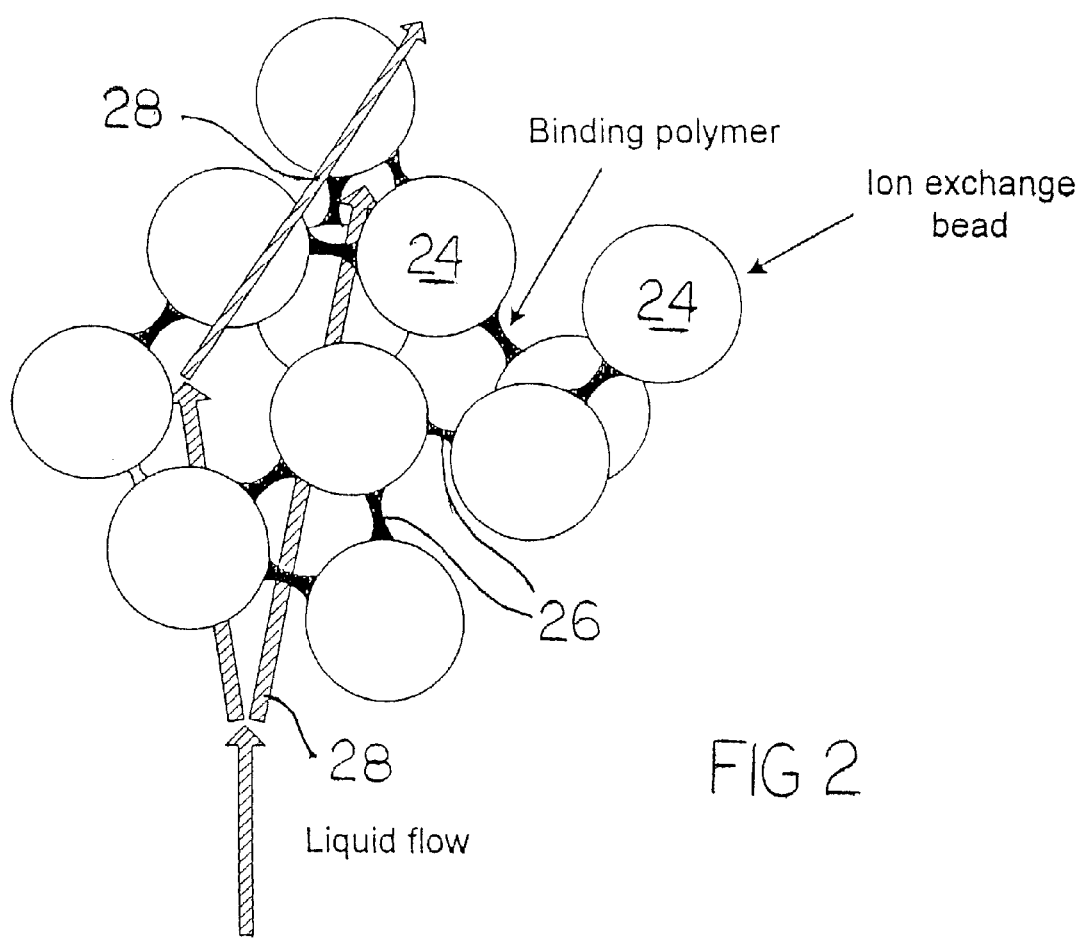
FIG. 2 is a schematic depiction of an exemplary porous, immobilized ion-exchange material, in accordance with features of the present invention.

The desalting performance of an electrodeionization stack using the resin wafer was tested. The resin wafers was packed using an electrodialysis stack (TS-2, Tokoyama Inc.) Six thin rubber gaskets were stacked together to provide a proper flow path as shown in FIG. 2. Silicone caulking adhesive (Dow Coring Inc.) was applied to both sides of the wafer which contacted with the gaskets. This was to prevent the flow by-pass via the sides of the wafer. Four pairs of dilute and concentrate compartments packed with the resin wafers were assembled. The stack was first tested for a flow leakage. With a flow rate of 0.45 gallon per minute (GPM) circulated in the dilute and concentrate compartments, the pressure drop was less than 1.5 psi. No external as well internal leakage was found. This shows that the EDI device can be assembled using commonly used electrodialysis stack and equipment. It also indicates that good flow rate with low pressure drop and operation without leakage between the cell compartments can be achieved.

EXAMPLE 4

After the leak test, the desalting performance was carried out. The electrodeionization (i.e., desalting) was operated in a continuous process with 500 mg/L of NaCl as the feed solution. Four liters of 5000 mg/L NaCl solution was circulated in the concentrate compartment. Three wt.% $Na_2SO_4$ was used as the electrolytic rinse solution.

Table 3 shows the desalting capability of the resin wafer stack. A NaCl removal efficiency of 70% in the feed stream was achieved using this prototype resin wafer stack with a single pass through.

TABLE 3

| Feed flow Rate (ml/min) | Product (NaCl) (mg/L) | Product Conductivity (mS/cm) | Product pH Value | Removal Rate (mg/hour/cm$^2$) | Removal (%) |
|---|---|---|---|---|---|
| 188.0 | 208.5 | 0.600 | 3.44 | 4.122 | 57.8% |
| 156.0 | 184.6 | 0.531 | 3.51 | 3.707 | 62.6% |
| 132.0 | 185.2 | 0.501 | 3.57 | 3.131 | 62.5% |
| 105.0 | 148.9 | 0.427 | 3.59 | 2.783 | 69.9% |

EXAMPLE 5

The electrodeionization of NaCl concentration from dextrose syrup was carried out. Using the same operating parameters as example 3 except the feed solution was replaced with 500 mg/L of NaCl in 32 wt. % of glucose solution. The presence of high concentration of glucose significantly decreased the conductivity of the feed solution. Table 4 shows the results. Even at such low conductivity feed stream, a removal efficiency of 62% was achieved with a single pass through using his EDI device. Very notably, 99.9 percent of the dextrose was recovered and the loss to the concentrate was less than 0.1 percent.

TABLE 4

| Feed flow Rate (ml/min) | Product (NaCl) (mg/L) | Product Conductivity (mS/cm) | Product pH Value | Removal Rate (mg/hour/cm$^2$) | Removal (%) |
|---|---|---|---|---|---|
| 63.0 | 271.6 | 0.235 | 3.38 | 1.148 | 46.6% |
| 50.0 | 258.6 | 0.221 | 3.42 | 0.961 | 49.2% |
| 48.0 | 234.1 | 0.203 | 3.45 | 1.013 | 54.0% |
| 35.0 | 194.9 | 0.176 | 3.48 | 0.844 | 61.7% |

EXAMPLE 6

Wafers were manufactured using an average of 30 weight percent (range of 25 to 35 weight percent) of a binding material, such as polyethylene.

Strong acid cation exchange resin of the gel type and strongly basic anion exchange resin of the gel type were used in making these wafers. Exemplary acid cation exchange resins, and basic anion exchange resins includes Purolite C-155, and Purolite A 4441, respectively, both available from Purolite, Inc. Bala Cynwyd, Pa.

These rigid molded wafers were 3 mm in thickness and had a porosity of approximately 35% free liquid space. Water and other solutions flowed freely through the wafer with little resistance and pressure drop. For example, at a flow rate of a dextrose (30 wt %) solution at 30 ml/min.cm$^2$ across the width of the wafer, a pressure drop of only 6 pounds per square inch was required. These wafers had very good ionic conductivities and were used for desalination of salt solution in water and deionization of carbohydrate containing solutions.

The wafers were cut and fitted into rubber gaskets and sandwiched between cation and anion exchange membranes in a typical electrodialysis stack (e.g., TS-2, Tokuyama, Inc.) as described in the earlier examples. The stack assembly was then connected to the flow pumps and power supply and operated for the deionization tests.

For salt solution desalination, a solution of 500 parts per million NaCl in water was fed and a voltage of approximately 5 to 6 volts was applied across the stack.

Greater than 99% desalination was readily achieved and under certain conditions 99.8% desalination was achieved in one pass flow through this EDI device.

For carbohydrate solution desalination, a solution containing approximately 30% (w/w) dextrose in water with 500 ppm equivalent of NaCl ions was fed and a voltage of approximately 10 volts was applied across the stack. Desalination ranging between 90 to 95% was readily achieved in one pass flow through the EDI device.

Wafer Material

Application Detail

The porous immobilized ion-exchange material can be shaped into a myriad of configurations, depending on the EDI device utilized. For typical stack configurations, which incorporate a plurality of diluant and concentrate compartments, wafers of the material, having relatively uniform thicknesses of between approximately 2 and 6 millimeters, are preferable. The wafers are suitably porous with between 20 percent and 60 percent porosity so that a liquid will flow through it with minimal resistance and the resin beads should be uniformly dispersed in close proximity to each other. "Porosity" is construed herein as the macroscopic void space that can be filled by a liquid.

Figure 3:
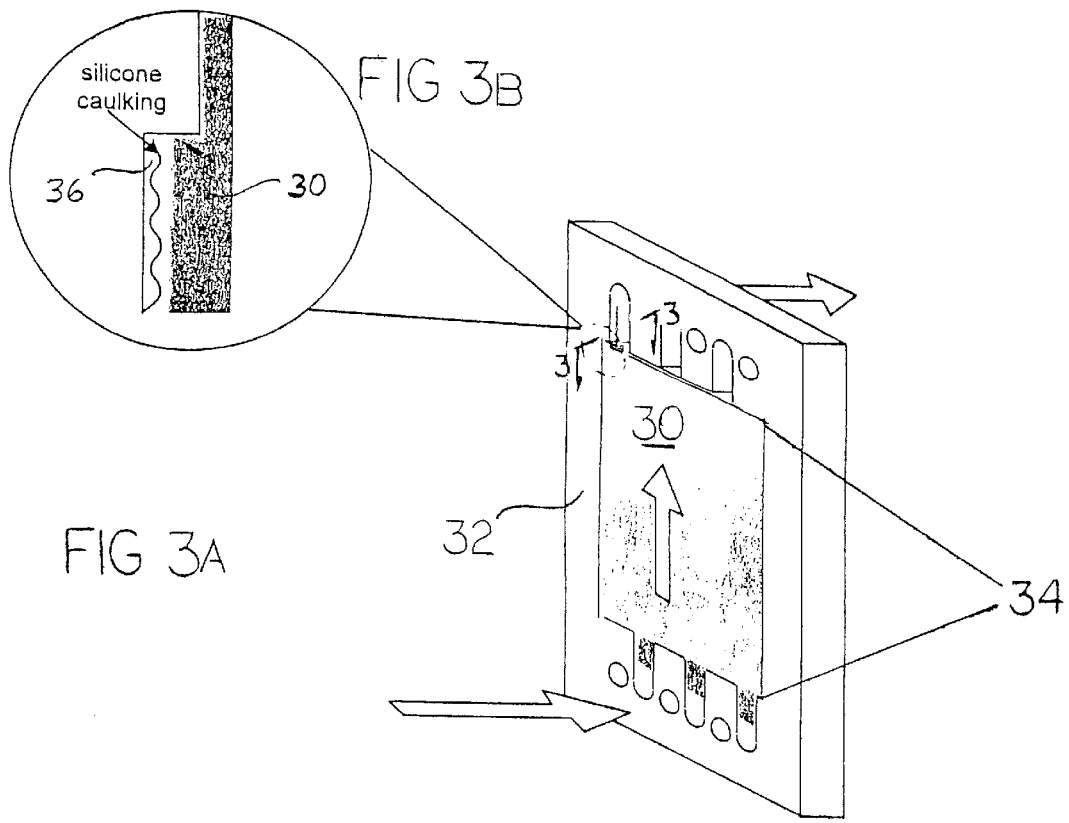
FIG. 3A is a depiction of an exemplary porous immobilized ion-exchange material in communication with a stack gasket, in accordance with features of the present invention.
FIG. 3B is an expanded view of a portion of FIG. 3A, taken along line 3—3.

As depicted in FIG. 3, a wafer 30 is cut into a form that is used in typical electrodialysis stacks 32. The wafer 30 is generally secured in an opening 34 defined by the rubber gasket, via adhesive (such as the silicone caulking 36 depicted in 3B), or via friction which occurs upon swelling of the wafer once wet. The swelling phenomenon is due to the expansion of the resin particles in the wafer.

Figure 4:
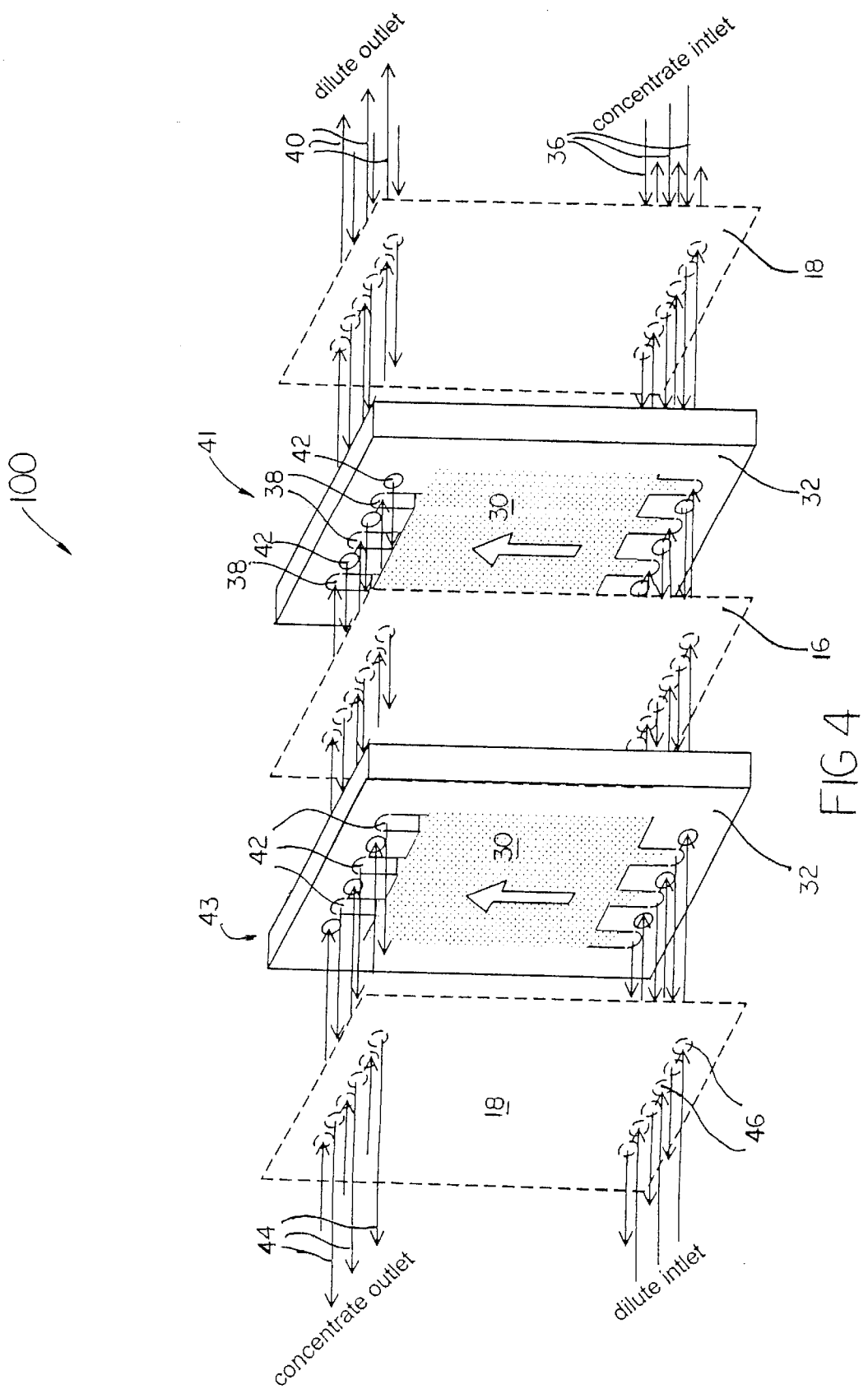
FIG. 4 is a flow diagram of an EDI device incorporating an exemplary porous immobilized ion-exchange material, in accordance with features of the present invention.

A schematic depiction of a stack assembly with diluting/feed compartments, the concentrate compartments, and the invented porous, immobilized ion-exchange material is designated as numeral 100 in FIG. 4. But for the juxtaposition of the invented wafer 30 between the anion exchange membranes and cation exchange membranes, the assembly 100 is a flow diagram of a typical electrodialysis stack assembly. The diluate compartment 41 is formed from the juxtaposition of the wafer 30 intermediate the cation exchange membrane 16 and anion exchange membrane 18, upstream from the concentrating compartment, 43.

Note that the concentrating compartment 43 also can be fitted with a wafer so that there are no force imbalances on the membranes. This assures that the wafers are evenly pressed on the membranes, thereby preventing flow channeling between the membranes and the wafers while also facilitating sealing between the compartments.

In operation, an untreated feedstream 46 enters the stack assembly 100. Upon contact with the wafer 30, the feedstream permeates upwardly, in the direction of the arrows, while simultaneously being subjected to the effect of the anionic exchange membrane 18 and cationic exchange membrane 16. As the feedstream permeates upwardly through the wafer 30, anions and cations are pulled off of the ion-exchange resin particles as a result of an electrical potential (not shown) applied to the stack. This facilitates regeneration of the wafer constituents in situ.

At the top of the stack, diluate liquid (i.e., feed stream liquid without ionic contaminant) enters diluate conduits 38 and removed via diluate exit ports 40. Concomitant with the diluate removal, concentrated salt solution is removed via transport through separate concentrate conduits 42 and ultimately from the stack assembly through concentrate exit ports 44.

Concentrate ports 36 direct extracted ionic contaminants out of the stack and in a direction opposite the flow of the treated diluant.

While the invention has been described with reference to details of the illustrated embodiment, these details are not intended to limit the scope of the invention as defined in the appended claims.

What is claimed is:

1. An electrodeionization device comprising:
    a) a cation-exchange membrane;
    b) an anion-exchange membrane juxtaposed co-planarly to said cation exchange membrane;
    c) porous ion-exchange material, in the form of a wafer capable of being squeezed and stretched, positioned intermediate said cation-exchange membrane and said anion exchange membrane to form a compartment, wherein the material comprises anion-exchange entities and cation exchange entities immobilized relative to each other via a binder which comprises 25 to 35 weight percent of said material but which does not substantially coat the entities; and
    d) a means for applying an electrical potential to said compartment.

2. The device as recited in claim 1 wherein the entities are embedded in a means for fixing their relative positions so as to confer rigidity to the material.

3. The device as recited in claim 1 wherein the entities are imbedded in thermoplastic selected from the group consisting of linear low density polyethylene, high density polyethylene, and combinations thereof.

4. The device as recited in claim 1 wherein the entities are attached to each other via dendrites.

5. The device as recited in claim 4 wherein the dendrites are binding polymers selected from the group consisting of fluoroelastomers, natural rubbers and combinations thereof.

6. The device as recited in claim 1 wherein the binder is present in a weight ratio to the entities of 1:3.

7. The device as recited in claim 1 wherein the material is between 20 and 60 percent porous.

8. The device as recited in claim 1 wherein the material is porous and rigid.

9. The device as recited in claim 1 wherein the wafer is removably positioned intermediate said cation exchange membrane and said anion exchange membrane.

10. A method for subjecting a fluid to electrodeionization, the method comprising:
   a) supplying a porous, ion-exchange material in the form of a wafer capable of being squeezed and stretched, wherein the material comprises anion exchange entities and cation exchange entities immobilized relative to each other via a binder which comprises 25 to 35 weight percent of said material but which does not substantially coat the entities;
   b) applying an electrical potential across the material;
   c) contacting the fluid to the substrate so as to facilitate removal of ionic contaminants from the fluid; and
   d) simultaneous with step c, regenerating the resin, in situ.

11. The method as recited in claim 10 wherein the entities are connected to each other via dendrites.

12. The method as recited in claim 11 wherein the dendrites comprise binding polymers selected from the group consisting of fluoroelastomers, natural rubbers, and combinations thereof.

13. The method as recited in claim 10 wherein the material is intermediate an anion exchange membrane and a cation exchange membrane to form a compartment, the membranes coplanarly arranged relative to each other.

* * * * *